Dec. 8, 1931.  O. F. SHEPARD  1,835,906
ALTERNATING CURRENT RELAY
Filed June 14, 1928   2 Sheets-Sheet 1

Inventor
Oscar F. Shepard
By Wood & Wood
Attorneys

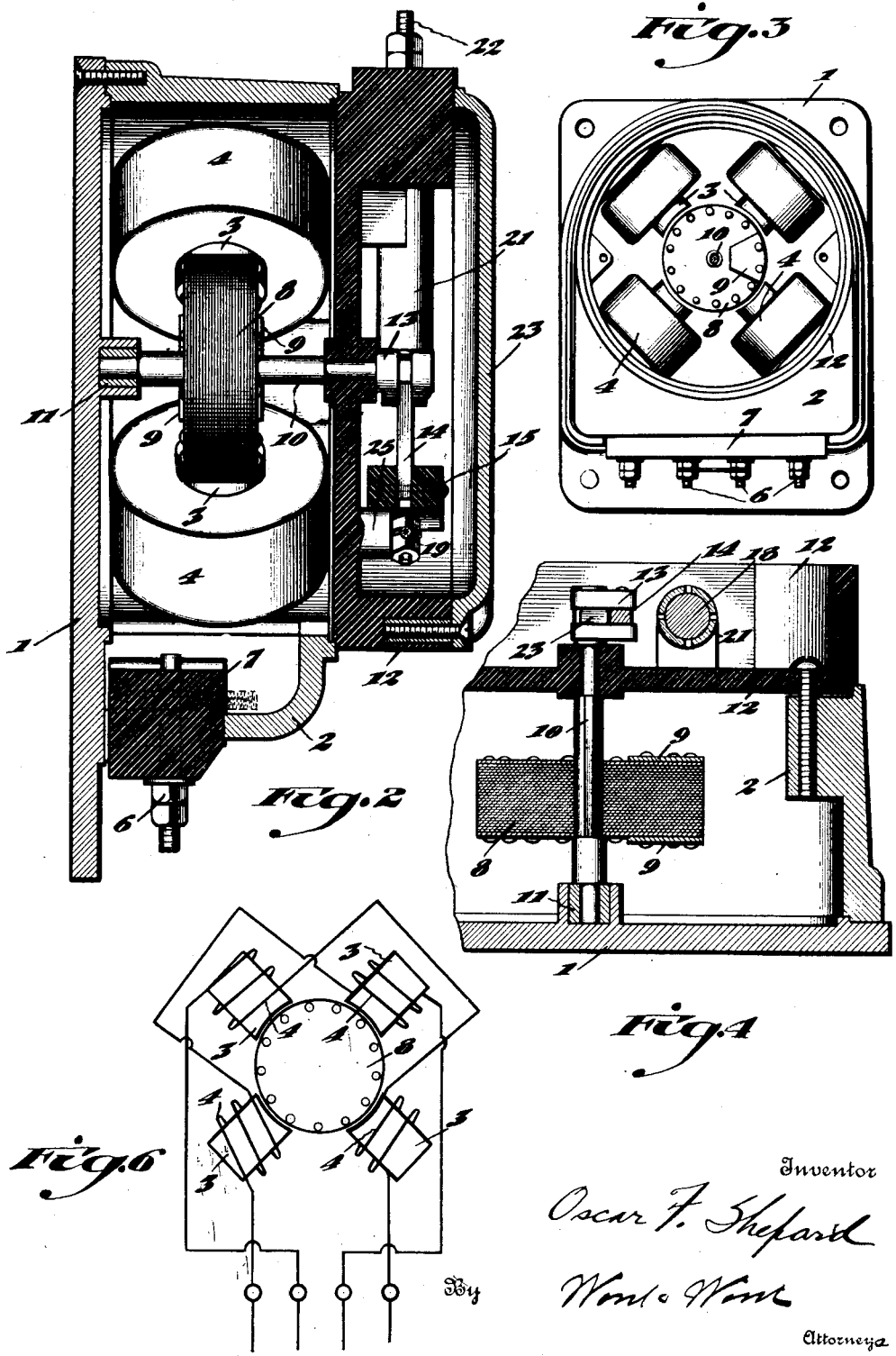

Patented Dec. 8, 1931

1,835,906

UNITED STATES PATENT OFFICE

OSCAR F. SHEPARD, OF CINCINNATI, OHIO

ALTERNATING CURRENT RELAY

Application filed June 14, 1928. Serial No. 285,415.

This invention relates to alternating current relays commercially known also as reverse phase relays used to protect alternating current electric machinery against damage that would result from the reversal of any power phase, causing the motor to operate in the wrong direction.

The relay of the present invention constitutes an electric motor of reduced size or capacity, having its armature shaft connected to an element of an electric current switch for closing the switch in one direction of armature or rotor rotation, and opening the switch in a reverse direction.

The motor operates on the same principle as a standard polyphase induction motor and consists of a cast iron casing section having four pole pieces or field cores radially disposed within the casing and in pairs diametrically, each pole containing an energizing coil. For two phase connection, one pair of coils are connected in one phase and the other pair in a second phase. This is, therefore, a two pole motor with the poles of one phase in quadrature with the poles of the other phase.

A squirrel cage type of rotor is concentrically disposed between the ends of the pole, providing the rotating element, and under the two phase arrangement of the magnetic circuit causes the motor to rotate in one direction or the other, depending upon the phase relations of the circuit.

A shaft for the rotor in one of its ends is journalled within a bearing in a base or back plate, forming a rear closure and support for the motor field casing section, and the opposite end of the shaft is journalled in a bearing of a second casing section, providing the casing for the electric switch mechanism. The latter casing section is preferably of insulating material and is secured to the motor casing. The relay, therefore, comprises a motor unit and an electric switch unit, each self-contained with the shaft of the rotor connecting with the movable elements of the electric switch.

The rotor is limited in its arc of rotation and counterweighted to automatically move the electric switch to a throw-out position for automatic switch control in case of phase failure, or when the circuit to the electric motor is cut off.

It is, therefore, an object of the invention to provide a relay of sectional casing structure with the sections respectively providing a self-contained motor unit and an electric switch unit with the casing of the switch unit secured to the casing of the motor unit for compact assembly, and to provide a simple and sturdy device, efficient and reliable in operation.

The switch device comprises a swinging arm carrying a depressible contact engageable with a stationary contact, the swinging contact arm or bar connected to the rotor shaft by a short crank arm fixed to the rotor shaft and a link connecting the crank arm and contact bar.

With a short crank bar attached to the shaft of the rotor, the torque caused by the motor is multiplied and the torque increased as the connecting link approaches the rotor shaft. The crank and link connection with the swinging contact bar provides a flexible connection adapting the depressible contact carried by the bar to be forcibly engaged with the stationary contact to obtain a good contact pressure for the contacts or the circuit closing control, and the switch is maintained under a closing pressure and continues as long as the torque exerted by the coils is maintained to move the rotor in an appropriate direction for bringing the contacts in engagement, or until the electric current in the coils of all or one phase is interrupted.

Other objects and certain advantages will be more fully set forth in a description of the accompanying drawings forming a part of this application, in which:

Figure 2 is a sectional view taken on line 2—2, Figure 1, detailing the interior parts of the relay.

Figure 4 is a sectional view taken on line 4—4, Figure 1, further detailing the interior construction and arrangement of parts.

Figure 5 is a diagrammatic view illustrating the moving contact bar of the relay swung into engagement with the stationary contact.

Figure 6 is a wiring diagram of the relay, showing a two phase connection.

Figure 1:
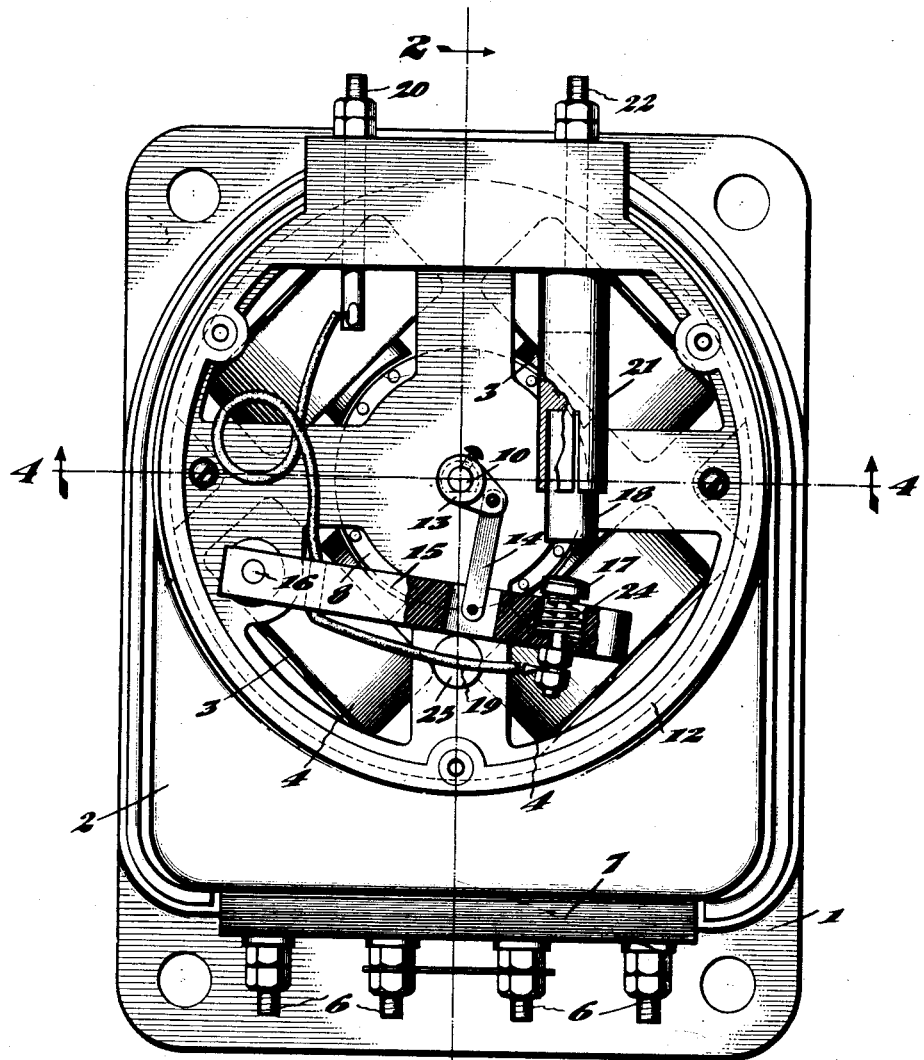
Figure 1 is a front view of the reverse phase relay incorporating the present improvement.
Figure 3:
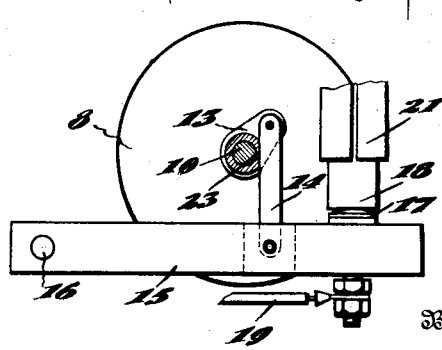
Figure 3 is a front view of the relay taken similar to Figure 1, a frame element being removed therefrom for the purpose of illustrating the armature and poles.

Referring to the drawings, 1 indicates a base or back plate upon which a motor field casing 2 is secured. The motor casing is provided with a plurality of inwardly extending radial cores or pole pieces 3, four in number being utilized, each integral with the casing.

The cores are arranged in diametrically disposed pairs, each core respectively carrying a coil 4, and for a two phase connection the coils are connected in pairs and preferably in series circuit connection, as indicated in the wiring diagram, Figure 6, with the leads of each pair of coils extending to and connecting to a respective terminal post 6 engaged through an insulator block 7 recessed within the lower wall of the motor casing and secured thereto, as a component of the motor casing. For a three phase connection, the terminal posts are arranged in a row with one lead of each pair of coils connected to a common terminal post or to separate posts strapped together, as shown in Figure 1.

The use of a plurality of coils arranged in pairs and the general wiring scheme for the motor of a relay of this character follows a common practice, although the motor construction of the present invention follows along simple principles of reliable and sturdy design.

A standard squirrel cage rotor 8 is employed and preferably counter-weighted by adding sections of lamina 9 correspondingly at opposite sides of the rotor to swing the rotor by gravity to a position which will separate the contacts of an electric switch controlled by the rotor when the coils of the field are all or partially de-energized in the event of a break in the power supply.

The rotor is fixed to a shaft 10 having one end engaged and journalled in a bearing 11 in the base or back plate, and its opposite end is journalled in a bearing in the casing section 12 of the electric switch unit secured to the forward side of the motor casing. The switch casing is preferably made of an insulating material.

The end of the rotor shaft 10 extends into the switch casing and carries a short crank arm 13. The crank arm is bifurcated to receive one end of a link 14 pivotally secured thereto. The opposite end of the link 14 is pivotally connected to a contact bar 15, preferably of insulating material, pivoted at 16 to and within the switch casing 12. The forward end of the contact bar is counter-bored for the reception of a depressible contact 17 having a head of button form for engagement with a stationary contact 18. The stem of the depressible contact is loosely engaged through the bore in the contact bar and provided with lock nuts for making a circuit lead connection as a wire 19, which connects with a terminal post 20 extending through the switch casing. The stationary contact 18 may represent a bar of carbon engaged into the tubular end of a holder 21 fixed to the switch casing by means of a terminal post 22. The switch casing is covered by a cap plate 23.

Under normal operation of the relay, when the coils are energized, the rotor will move in an appropriate direction, swinging the crank arm when the relay is mounted in the position shown in Figure 1, upwardly or in a direction which will swing the contact arm toward the stationary contact, bringing the head of the depressible contact 17 into engagement with the stationary contact 18 until limited in action by the link abuttingly engaging with a squared face 23 formed on the hub of the crank arm, as shown in Figure 5.

The depressible contact is yieldingly held in engagement with the stationary contact by a coil spring 24 about the stem of the depressible contact seated within the bore of the contact bar.

Should there be a reversal of a power phase which would cause the motor to operate in the reverse direction, the contact would be depressed until it engaged against the stop plug 25 laterally extending from the rear wall of the switch casing. In the event of an interruption of one or more phases of the power supply the counter-weight of the rotor will move the same in a reverse direction assisted by the weight of the contact arm, lowering the switch contact away from the stationary contact.

This construction of switch provides a good contact pressure for closing the electric circuit controlled by the switch, and also good separation. The structure of the switch is very sturdy in design, very durable, and free and easy in operation.

The device when used in connection with a control for alternating current electrical machinery, fully protects the machinery from phase failure, phase reversal, and exceedingly low voltage.

The device can be easily mounted in position in any convenient or available place and readily hooked up by making the connections to the terminal posts at the lower side of the device, extending from the casing, and the electric circuit connections of the controlled circuit to the terminal posts extending from the upper sides of the switch casing, the user not being concerned with any connections interior of the casing.

Having described my invention, I claim:

An alternating current relay constituting a motor unit, having a casing section for forming the motor field, an electric switch unit having a casing section secured to a face side of the motor casing, a back plate secured to the rear side of the motor casing, a cover plate secured to the face side of the switch casing, said motor casing having a plurality of inwardly extending radial cores, each carrying a field magnet coil, the cores arranged in diametric pairs, a rotor concentric with the ends of the cores having a shaft journalled in said back plate and switch casing, and extending into the switch casing, a swinging contact carrying bar pivoted within the switch casing, having a depressible contact for engagement with a stationary contact, a short crank arm fixed to the rotor shaft, a link connecting the crank arm and contact bar and extending at an angle to the crank arm for moving the contact bar in alternate directions under the influence of the rotor, and a stationary contact within the switch casing for engagement with the depressible contact.

In witness whereof, I hereunto subscribe my name.

OSCAR F. SHEPARD.